United States Patent
Mikami et al.

(10) Patent No.: US 7,065,539 B2
(45) Date of Patent: Jun. 20, 2006

(54) DATA TRANSFER METHOD

(75) Inventors: Shogo Mikami, Yokohama (JP);
Motoaki Hirabayashi, Yokohama (JP);
Naoki Shimada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 362 days.

(21) Appl. No.: 10/366,557

(22) Filed: Feb. 14, 2003

(65) Prior Publication Data

US 2004/0010490 A1    Jan. 15, 2004

(30) Foreign Application Priority Data

Jul. 15, 2002   (JP)   ............................. 2002-204992

(51) Int. Cl.
*G06F 17/30* (2006.01)
(52) U.S. Cl. ...................... 707/202; 714/100; 718/100
(58) Field of Classification Search ................ 707/202; 714/100; 718/100
See application file for complete search history.

(56) References Cited

U.S. PATENT DOCUMENTS

| | | | |
|---|---|---|---|
| 5,235,601 A | 8/1993 | Stallmo et al. | |
| 5,457,791 A | 10/1995 | Matsumoto et al. | |
| 5,778,224 A * | 7/1998 | Tobe et al. | 718/100 |
| 5,778,395 A * | 7/1998 | Whiting et al. | 707/204 |
| 5,892,915 A * | 4/1999 | Duso et al. | 709/219 |
| 5,907,673 A | 5/1999 | Hirayama et al. | |
| 6,256,773 B1* | 7/2001 | Bowman-Amuah | 717/121 |
| 6,345,281 B1* | 2/2002 | Kardos et al. | 707/201 |
| 6,473,794 B1* | 10/2002 | Guheen et al. | 709/223 |
| 6,636,984 B1 | 10/2003 | McBrearty et al. | |
| 6,732,123 B1 | 5/2004 | Moore et al. | |
| 6,735,293 B1* | 5/2004 | Doherty et al. | 379/201.12 |
| 6,857,012 B1* | 2/2005 | Sim et al. | 709/222 |
| 2002/0007363 A1 | 1/2002 | Vaitzblit | |
| 2003/0217053 A1* | 11/2003 | Bachman et al. | 707/4 |

FOREIGN PATENT DOCUMENTS

JP    2001-175423    6/2001

* cited by examiner

*Primary Examiner*—Wayne Amsbury
(74) *Attorney, Agent, or Firm*—Mattingly, Stanger, Malur & Brundidge, P.C.

(57) ABSTRACT

A data transfer method which quickens the resumption of work execution in an environment in which works are executed by a plurality of computers according to a schedule. The work server identifies a work to be processed, identifies a file used by the identified work, and then restores the data of the identified file.

4 Claims, 12 Drawing Sheets

FIG. 3

| WORK NAME 301 | START TIME 302 | STATE 303 | JOB EXECUTED BY WORK (WORK SERVER) 304 |
|---|---|---|---|
| WORK H | 8:00 | NORMALLY COMPLETED | JOB H1 (1) |
| FULL BACKUP | 9:00 | NORMALLY COMPLETED | |
| WORK A | 10:00 | CURRENTLY UNDER WAY | JOB A1(1), JOB A2(1) |
| WORK B | 11:00 | TO BE EXECUTED | JOB B1(2), JOB B2(2) |
| WORK C | 12:00 | TO BE EXECUTED | JOB C1(2) |
| WORK F | 13:00 | TO BE EXECUTED | JOB F1(2), JOB F2(1), JOB F3(1) |
| WORK D | 14:00 | TO BE EXECUTED | JOB D1(1), JOB D2(1) |

FIG. 4

| WORK NAME | START TIME | END TIME | STATE | JOBS EXECUTED BY WORK |
|---|---|---|---|---|
| WORK H | 8:00 | 8:30 | NORMALLY COMPLETED | JOB H1 |
| FULL BACKUP | 9:00 | 9:00 | NORMALLY COMPLETED | |
| WORK E | 8:00 | 10:00 | NORMALLY COMPLETED | JOB E1, JOB E2, JOB E3 |
| WORK A | 10:00 | | CURRENTLY UNDER WAY | JOB A1, JOB A2 |

| JOB NAME (501) | FILE NAME (502) | STORAGE DEVICE (503) |
|---|---|---|
| JOB A1 | FILE A1 | STORAGE DEVICE 1 |
| JOB A2 | FILE A2 | STORAGE DEVICE 1 |
| JOB E1 | FILE E1 | STORAGE DEVICE 2 |

FIG. 5B

| JOB NAME | FILE NAME | STORAGE DEVICE |
|---|---|---|
| JOB C1 | FILE C1 | STORAGE DEVICE 1 |
| JOB E2 | FILE E2 | STORAGE DEVICE 2 |
| JOB E3 | FILE E3 | STORAGE DEVICE 2 |
| JOB F1 | FILE F1 | STORAGE DEVICE 2 |

FIG. 6A

| STORAGE DEVICE NAME (601) | WORK NAME (602) | FILE NAME (603) |
|---|---|---|
| STORAGE DEVICE 1 | WORK A | FILE A1, FILE A2 |
| STORAGE DEVICE 1 | WORK C | FILE C1 |

| STORAGE DEVICE NAME | WORK NAME | FILE NAME |
|---|---|---|
| STORAGE DEVICE 2 | WORK E | FILE E1, FILE E2, FILE E3 |
| STORAGE DEVICE 2 | WORK F | FILE F1 |

FIG. 6B

| STORAGE DEVICE NAME | WORK NAME | FILE NAME |
|---|---|---|
| STORAGE DEVICE 1 | WORK A | FILE A1, FILE A2 |
| STORAGE DEVICE 1 | WORK C | FILE C1 |

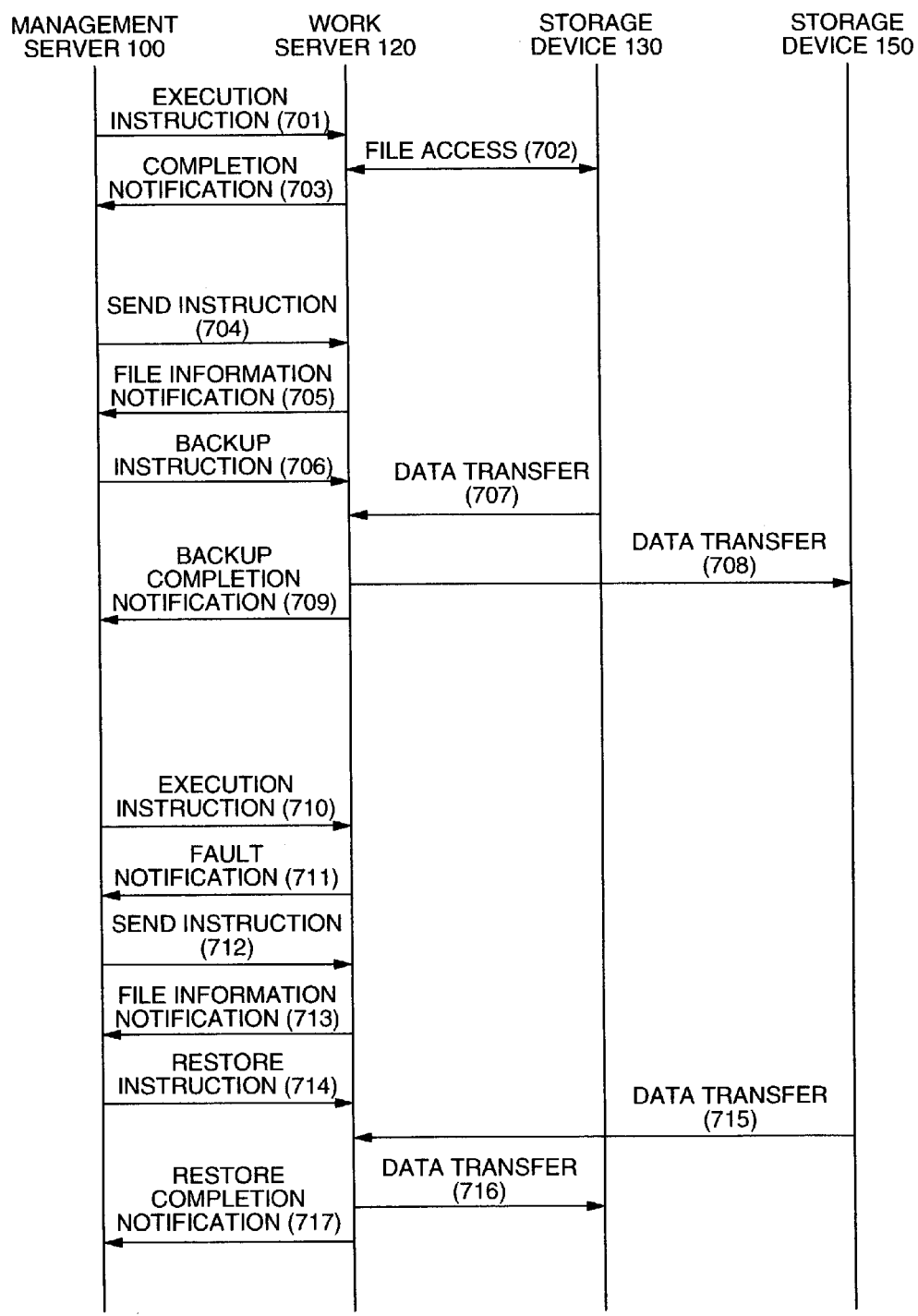

FIG. 8

| WORK | A1 | A2 | B1 | B2 | C1 | D1 | D2 | E1 | E2 | E3 | F1 | F2 | F3 | G1 | H1 |
|------|----|----|----|----|----|----|----|----|----|----|----|----|----|----|----|
| WORK H |   |   |   |   |   |   |   |   |   |   |   |   |   |   | ○ |
| FULL BACKUP |   |   |   |   |   |   |   |   |   |   |   |   |   |   |   |
| WORK E |   |   |   |   |   |   |   |   |   | ○ |   |   |   |   |   |
| WORK A |   |   |   |   |   |   |   | ○ | ○ |   |   |   |   |   |   |
| WORK B |   |   | ○ | ○ |   |   |   |   |   |   |   |   |   |   |   |
| WORK C | ○ | ○ |   |   | ○ |   |   |   |   |   |   |   |   |   |   |
| WORK F |   |   |   |   |   |   |   |   |   |   | ○ | ○ | ○ |   |   |
| WORK D |   |   |   |   |   |   | ○ |   |   |   |   |   |   |   |   |

DATA TRANSFER METHOD

BACKGROUND OF THE INVENTION

The present invention relates to a technique for transferring data stored in a storage device to another storage device, and more particularly to a technique of restoring data.

When a fault occurs with a storage device, it is a conventional practice to first recover the failed storage device to normal before resuming interrupted work. This method, however, has a problem of taking long before the work can be resumed.

To address this problem a technique described in JP-A-2001-175423, for example, has been used which allows particular logical disks to be accessed, beginning with the highest level, before all logical disks are restored.

SUMMARY OF THE INVENTION

In an environment in which a plurality of computers are connected with storage devices via a network to perform complex processing, work is executed distributively by a plurality of computers. Further, to process a plurality of works efficiently, they are scheduled for efficient execution.

In such an environment, in the event that a fault occurs in a storage device, if the work execution is resumed only after the storage device is completely recovered to normal, a significant time is wasted before the resumption of work execution. Further, although the conventional art described above allows particular logical disks to be accessed, beginning with the highest level, before all logical disks are recovered, it does not disclose any relationship with the schedule of work executed by the computers.

In an environment in which works are executed by a plurality of computers according to a schedule, it is an object of the present invention to provide a method and apparatus to quicken the resumption of work execution.

To achieve the above objective, the method and apparatus of this invention identify works to be executed by the computer, identify files used by the identified works, and transfer data of the identified files from another storage device.

Other objects, features and advantages of the invention will become apparent from the following description of the embodiments of the invention taken in conjunction with the accompanying drawings.

BRIEF DESCRIPTION OF THE DRAWINGS

FIG. 3 is a table showing an example of a schedule file.

FIG. 4 is a table showing an example of a history file.

FIGS. 5A and 5B illustrate an example of file data.

FIGS. 6A and 6B illustrate an example of a fault remedy file.

FIG. 7 is a diagram showing an operation of the system.

FIG. 8 illustrates a relationship between works and files.

DESCRIPTION OF THE EMBODIMENTS

Figure 1:
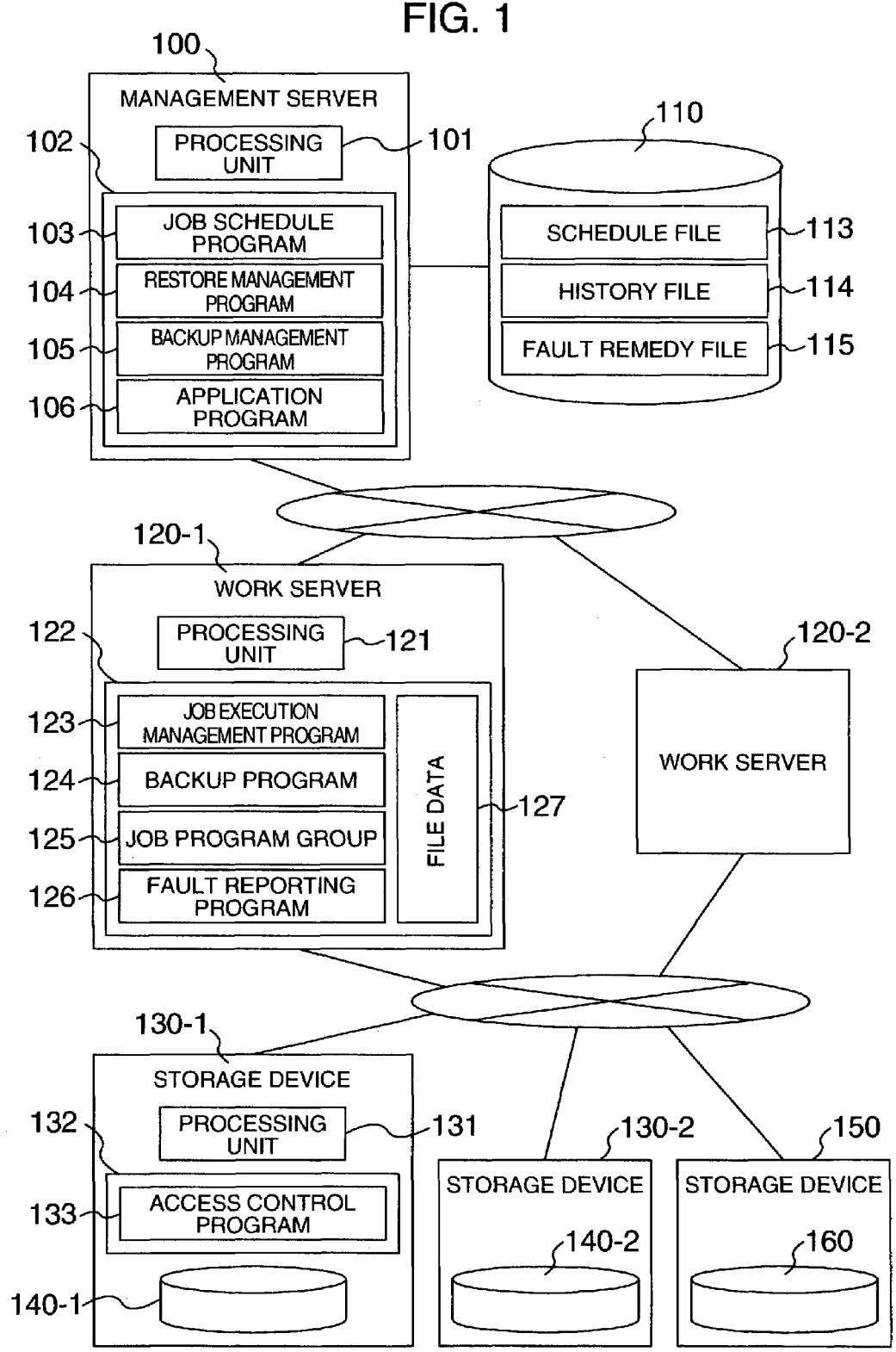
FIG. 1 is a schematic diagram showing an overall system configuration.

Now, one embodiment of the present invention will be described by referring to the accompanying drawings. FIG. 1 shows a configuration of an information processing system which executes works according to a predefined schedule. This system comprises a management server 100, work servers 120, storage devices 130 and a storage device 150. In the figure, the work servers 120 and the storage devices 130 are attached with indices (−1, −2) for their identification and they are identical in configuration unless otherwise specifically stated. The management server 100, work servers 120 and storage devices 130 have processing units 101, 121, 131 such as CPU and storage units 102, 122, 132, respectively. The processing units execute programs stored in the storage units to perform desired functions.

In the system shown in FIG. 1, the management server 100 and the work servers 120 are interconnected via LAN, and the work servers 120, the storage devices 130 and the storage device 150 are interconnected via a storage area network (SAN).

The management server 100 has a job schedule program 103 for managing a work execution schedule, a backup management program 105 for managing a backing up of those data stored in the storage devices 130 which are transferred to the storage device 150, and a restore management program 104 for managing a restoring of those data managed in the storage device 150 which are transferred to the storage devices 130. The management server 100 is connected with a storage device 110, in which are stored a schedule file 113 containing a schedule managed by a job schedule program 103, a history file 114 containing works executed according to the schedule, and a fault remedy file 115 containing information about files required in re-executing the works interrupted by an occurrence of a fault. Here, a job represents a unit of processing executed by the work servers 120 and a work represents processing executed by one or more jobs.

The work servers 120 has a job program group 125 consisting of a plurality of jobs to be executed according to instructions from the management server 100, a job execution management program 123 for managing the execution of these jobs, a backup program 124 for transferring data from the storage devices 130 to the storage device 150 according to the instructions from the management server 100 and backing up the data and for transferring data from the storage device 150 to the storage devices 130 and restoring the data, and a fault reporting program 126 for detecting faults in the storage devices 130 or the work servers 120 themselves and reporting them to the management server 100. The work servers 120 also have file data 127 containing names of files that are stored in the storage devices 130.

The storage devices 130 are used by the work servers 120 when executing jobs, and have an access control program 133 to control accesses made from the work servers 120 and a storage unit 140 to store files, or blocks of data. The storage unit 140 is a disk array composed of a plurality of disks and the storage devices 130 may be RAID.

The storage device 150 backs up files stored in the storage devices 130, and has an access control program 153 to control accesses from the work servers 120 and a storage unit 160 to store files, or blocks of data. The storage unit 160 is constructed of such devices as tapes and disks. The access control program 153 can read data from or write it into the storage unit 160 in units of file.

Figure 2A:
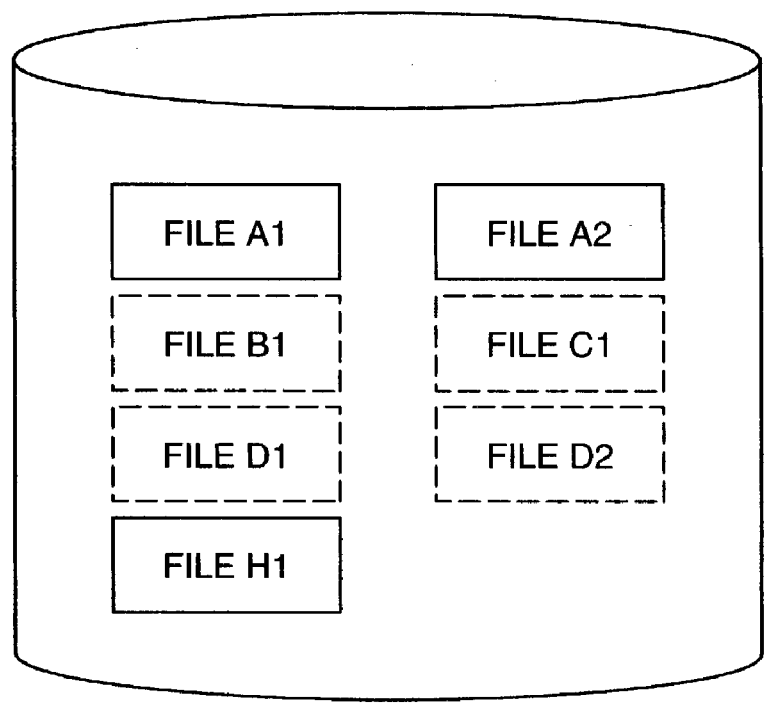
FIGS. 2A and 2B are diagrams showing files stored in storage devices.
Figure 2B:
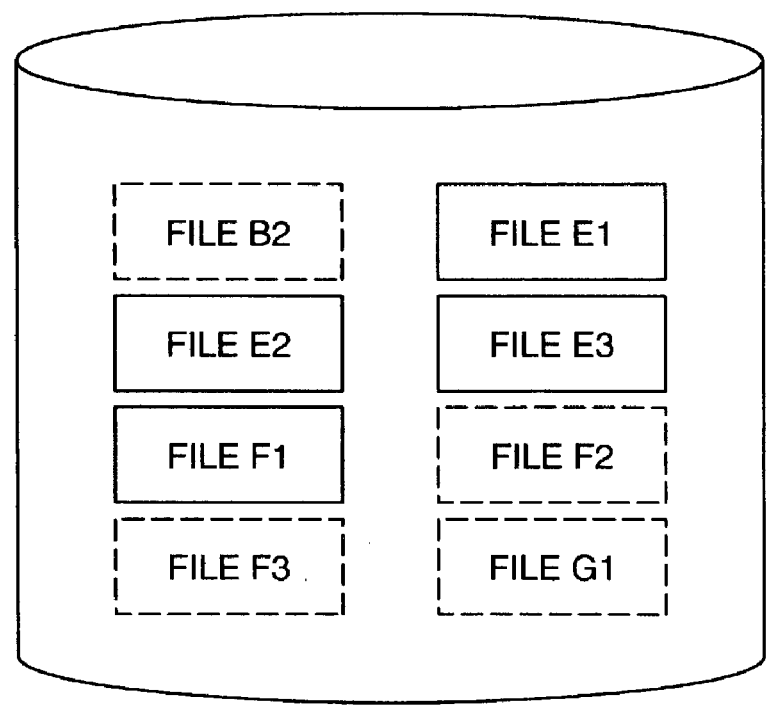

FIGS. 2A and 2B show data stored in the storage unit 140-1, 140-2 of the storage devices 130-1, 130-2. FIG. 2A shows data stored in the storage unit 140-1. Data are shown to be stored in the form of files. File A1, file A2 and file H1 represent files that are already stored. In reality, file B1, file C1, file D1 and file D2 are not yet stored and will be stored later as works are executed. FIG. 2B show files stored in the storage unit 140-2. Here, file E1, file E2, file E3 and file F1 are already stored, and file B2, file F2, file F3 and file G1 are those which will be stored as works are executed.

FIG. 3 shows one example of schedule information stored in the schedule file 113. The schedule information registered with the schedule file 113 includes names 301 of works to be executed, times 302 at which to start executing works, work execution statuses 303, and jobs 304 to be executed in each work. As to the jobs executed in the works, "job H1 (1)" for example means that the job H1 is executed by the work server 120-1. The file executed by each job is the corresponding file shown in FIG. 2. That is, the file generated or used by the job H1 is the file H1. The schedule information shown in FIG. 3 indicates that the system is currently in a state where the full backup is completed and the work A is being executed.

FIG. 4 shows one example of history information stored in the history file 114. The history information registered with the history file 114 includes names 401 of works executed by the work servers 120, work start times 402, work end times 403, statuses 404 and jobs 405 executed by the works. It is noted that while the history file 114 stores the history of works executed by the work servers, a work E is not registered with the schedule file 113. This indicates that the work E is one generated by an interrupt. Even in the work generated by an interrupt, the work servers that execute jobs are managed by a table (not shown) in the storage device 110.

The job schedule program 103 in the management server 100 generates schedule information based on works entered by an administrator and execution conditions of works (start times, order of executions, etc.) and registers the schedule information with the schedule file 113. The job schedule program 103 also monitors the registered schedule file 113 and sends to the work servers 120 an execution instruction for the work whose execution time has come. At this time the program registers a work name, a start time, an execution result and an executed job as history information with the history file 114. Here, the time at which the work execution instruction was issued to the work servers 120 is registered as the start time, and a state "under execution" is registered as the execution result. Upon receiving a work execution end report from the work servers 120, the job schedule program 103 registers an end time and an execution result as the history information. Here, the time at which the program received the work execution end report from the work servers 120 is registered as the end time, and a state "normal end" is registered as the execution result.

FIGS. 5A and 5B show one example of file information stored in a storage unit 122 of each of the work servers 120. FIG. 5A shows an example of file data stored in the storage unit 122 of the work server 120-1. The file data registered are job names 501, file names 502 and storage device names 503. FIG. 5B shows an example of file data stored in the storage unit 122 of the work server 120-2. The file information shown in FIG. 5A and FIG. 5B are managed by the associated work servers 120, more specifically by the job execution management program 123. The job execution management program 123, upon receiving a work execution instruction from the management server 100, starts a job for executing the work. It then monitors the initiated job and stores a file name used in the job and a storage device name along with the job name. The file data shown in FIGS. 5A and 5B are files stored in the respective storage units shown in FIGS. 2A and 2B and generated by the execution of the work.

FIGS. 6A and 6B show one example of file information of the fault remedy file 115. FIG. 6A shows file information by storage device names which was obtained by querying the work servers 120 about the fault reports the work servers 120 reported. FIG. 6B shows information on files to be restored for data recovery, which are determined from the file information of FIG. 6A. The file information shown in FIG. 6B constitutes the fault remedy file 115. As fault remedy file information, names of failed storage devices 601, work names 602 and file names 603 are registered. The file names 603 are picked up from the file names received from the work servers 120 and the schedule file 113, and are registered for each work.

Now, the overall operation of this system of FIG. 1 will be explained.

FIG. 7 shows an overall system operation. First, the job schedule program 103 of the management server 100 monitors the schedule file 113 and, when the time to start executing the work H is reached, registers the work H and the start time with the history file 114 and then issues an instruction to execute the work H to the work server 120 (701). The work execution instruction is issued in units of job to the work server 120 that is to execute the job. The job execution management program 123 of the work server 120 executes the job which it is instructed to execute, by exchanging data with the storage devices 130 (702). At this time, the job execution management program 123 registers as the file data those files in the storage devices which the executed job accessed. When the job execution ends, the job execution management program 123 of the work server 120 reports to the management server 100 that the job execution is completed (703). Upon receiving the report that all the jobs for the work H have been executed, the job schedule program 103 of the management server 100 registers the end time and the execution result of the work H with the history file 114.

Next, to execute a full backup according to the schedule, the job schedule program 103 issues a full backup instruction to the backup management program 105. There are two backup types. One type is to transfer data stored in the storage device 130 as is to the storage device 150, and the other is to transfer data stored in the storage device 130 on a file basis to the storage device 150. When the data is sent to the storage device 150 on a file basis, it is possible to read the data on a file basis at a time from the storage device 150.

The backup management program 105 issues a file information send instruction to the work server 120 (704). When the work server 120 receives the file information send instruction, the job execution management program 123 sends the file data stored in the storage unit 122 to the management server 100 (705).

The file information transferred from the work server 120 is classified for each storage device 130 as shown in FIG. 6A by the backup management program 105. The classed file information and the backup execution instruction are issued to the work server 120 (706). The work server 120, upon receiving the backup execution instruction, backs up data in units of file according to the file information received by the backup program 124. Here we describe a case of backup operation where the backup file data is received from the storage device 130 (707) and is transferred to the storage device 150 (708). This backup operation may be performed between the storage device 130 and the storage device 150 without passing the data through the work server 120. It is also possible to make one work server 120 perform the backup operation on a plurality of storage devices 130. That is, the backup management program 105 of the management server 100 may send the file information on the storage device 130-1 and the backup execution instruction to the work server 120-1 and the file information on the storage device 130-2 and the backup execution instruction to the work server 120-2. This causes each of the work servers to perform the backup operation. Further, the backup management program 105 may send the file information on the storage devices 130-1, 130-2 and the backup execution instruction to the work server 120-1 to have the work server 120-1 perform the backup operation on the storage devices 130-1, 130-2. In either case, the backup of the storage device 130 need only be performed on a file basis.

When it completes the backup operation for all files stored in the storage device 130, the backup program 124 reports to the management server 100 that the backup operation is finished (709). Upon receipt of the report, the backup management program 105 of the management server 100 stops the processing and informs the job schedule program 103 of the completion of the backup. The job schedule program 103 registers the normal end of backup operation and the end time with the history file.

In this way, the management server 100 instructs the work server 120 to execute works.

Next, we will describe a sequence of operations performed when a fault occurs in the storage device 130 while a work is being executed.

The management server 100, according to the schedule, issues a work A execution instruction to the work server 120 (710). The work server 120 executes jobs of the work A according to the instruction received. When the work server 120-1 detects that a fault has occurred with the storage device 130-1, the fault reporting program 126 sends information on the failed storage device 130-1 and fault occurrence information to the management server 100 (711). The management server 100, upon receipt of fault information, stops the job schedule program 103 and executes the restore management program 104. When a fault occurs, the works that have been executed after the full backup are processed first. To enable operation to be restarted quickly, the restore management program 104 performs the restore processing beginning with those files required for the execution of the works.

To identify the files stored in each of the storage devices 130, the restore management program 104 issues a file information send request to the work server 120 (712). The work server 120 sends the file information stored in the storage unit 127 to the management server 100 (713) and the restore management program 104 classifies the file information for each of the storage devices 130. Next, those files in other than the failed storage device which need to be restored are identified. FIG. 8 shows a relationship between the works that have been and will be executed after the full backup and the files used by these works. When a fault occurs with the storage device 130-1, if the processing is started from the work A, the files stored in the storage device 130-2 are not affected. But, in the case of FIG. 8, if a fault occurs with a work C, starting the processing from the work A affects the file B stored in the storage device 130-2. That is, assuming that the file B stored in the storage device 130-2 is read, processing is done using the values in the file B, and the result of the processing is registered as the file B with the storage device 130-2, the performing of the processing beginning with the work A may result in the content of the file B being changed from the initial one. Therefore, in this case, it is necessary to perform the restore operation on the file B held in the storage device 130-2. It is noted that, in this embodiment, when a fault occurs, processing is re-executed from the work that was executed after the full backup and which uses the files stored in the failed storage device 130. That is, in FIG. 8, when a fault occurs with the storage device 130-1 and if the full backup was done immediately before the work E, the processing restarts with the work A. If the full backup was performed between the work B and the work C, the processing restarts with the work B. Under this circumstance, the files to be restored into the storage device 130 that has no fault are determined as follows. First, a work that exists between the work in which a fault occurred and the work to be re-started following the fault is identified. Next, files that are used by the identified work are determined and the storage device in which these files are stored is also determined. If this storage device is not the failed storage device, the files thus determined are those upon which the restore operation is to be performed. The restore management program 104 generates the fault remedy file of FIG. 6 in this manner.

The restore management program 104 determines from the history file 114 a work to be re-executed and sends a restore execution instruction to the work server 120 to restore the files used by the work (714). Here, from the history information shown in FIG. 4, the work A is the one to be re-executed and the files A1, A2 are the ones to be restored. When the work server 120 receives the restore execution instruction, the backup program 124 registers the specified files of the storage device 150 with the storage device 130 (715, 716). After all the specified files have been registered, the work server 120 reports the completion of restore operation to the management server 100 (717). The restore management program 104 that has received the restore completion report deletes the names of restored files from the fault remedy file information and issues a work execution instruction to the job schedule program 103. More specifically, upon receiving the report of completion of restore operation of the files A1, A2 for the work A, the restore management program 104 issues a work A execution instruction to the job schedule program 103. Next, the restore management program 104 looks up the history file to determine the work to be executed next. If the history files has a work to be executed, the restore management program 104 issues a similar instruction for work execution after having restored the associated files. If the history file has no work to be executed, the restore management program 104 refers to the schedule file 113 and executes the works according to the schedule. The restore management program 104 performs the restore operation until there is no file registered in the fault remedy file of FIG. 6 before executing the works. Then, when no registered file exists in the fault remedy file, the restore management program 104 instructs the job schedule program 103 to execute the works according to the schedule and ends its processing.

Figure 9:
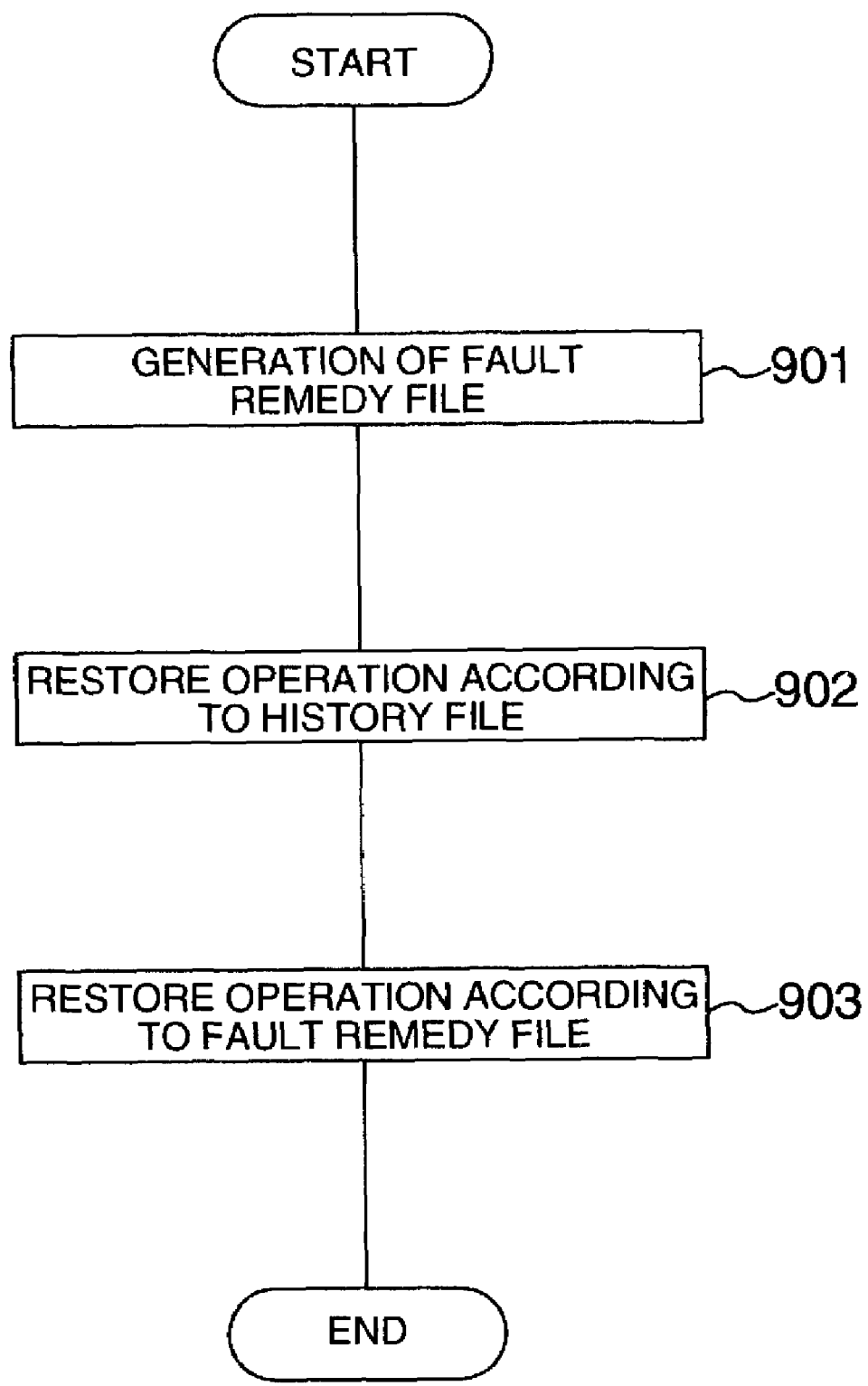
FIG. 9 is a flowchart showing processing performed by a restore management program.

FIG. 9 shows the processing performed by the restore management program 104. The restore management program 104 first generates a fault remedy file that identifies those files which require the restore operation as a result of the occurrence of a fault (901), then performs according to the history file the restore operation on only those files required by each work to be executed (902), and finally performs the restore operation according to the fault remedy file (903). Since, as described above, there may be a case where not all the associated files can be restored even by referring to the history file, the restore operation is also performed by referring to the fault remedy file.

Next, each of these processing will be described in detail.

Figure 10:
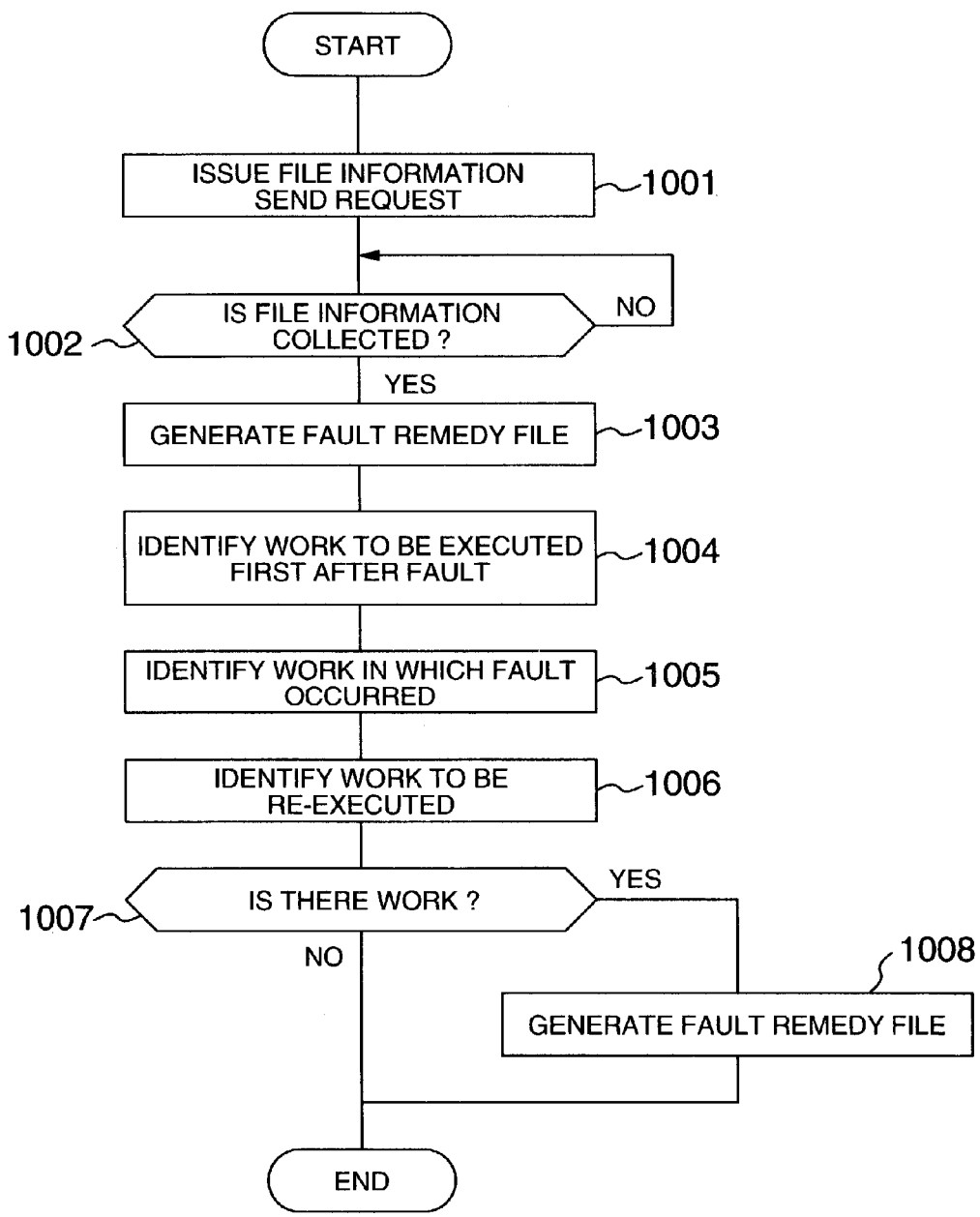
FIG. 10 is a flowchart showing processing performed by the restore management program.

FIG. 10 shows processing to generate a fault remedy file. The restore management program 104 issues a file information send request (1001) and, upon receiving the file information ("YES" in step 1002), groups the file information for each storage device 130 as shown in FIG. 6A. For the storage device in which a fault occurred, its files are used as is to generate a fault remedy file (1003). Next, the restore management program 104 determines those files in other than the failed storage device which require the restore operation. First, it determines the work that needs to be executed first after the fault occurred (referred to as a "work A") (1004). Next, it determines a work in which the fault occurred (referred to as a "work B") (1005). Then it determines works from the work A to the work B (1006) and checks if the determined works use other than the failed storage device (referred to as a "work C"). If there is a work classified as the work C ("YES" in step 1007), this work and the files used by the work are added to the fault remedy file (1008).

Now, file information is generated which contains those files used by the works to be executed following the occurrence of a fault which need to be restored.

Figure 11:
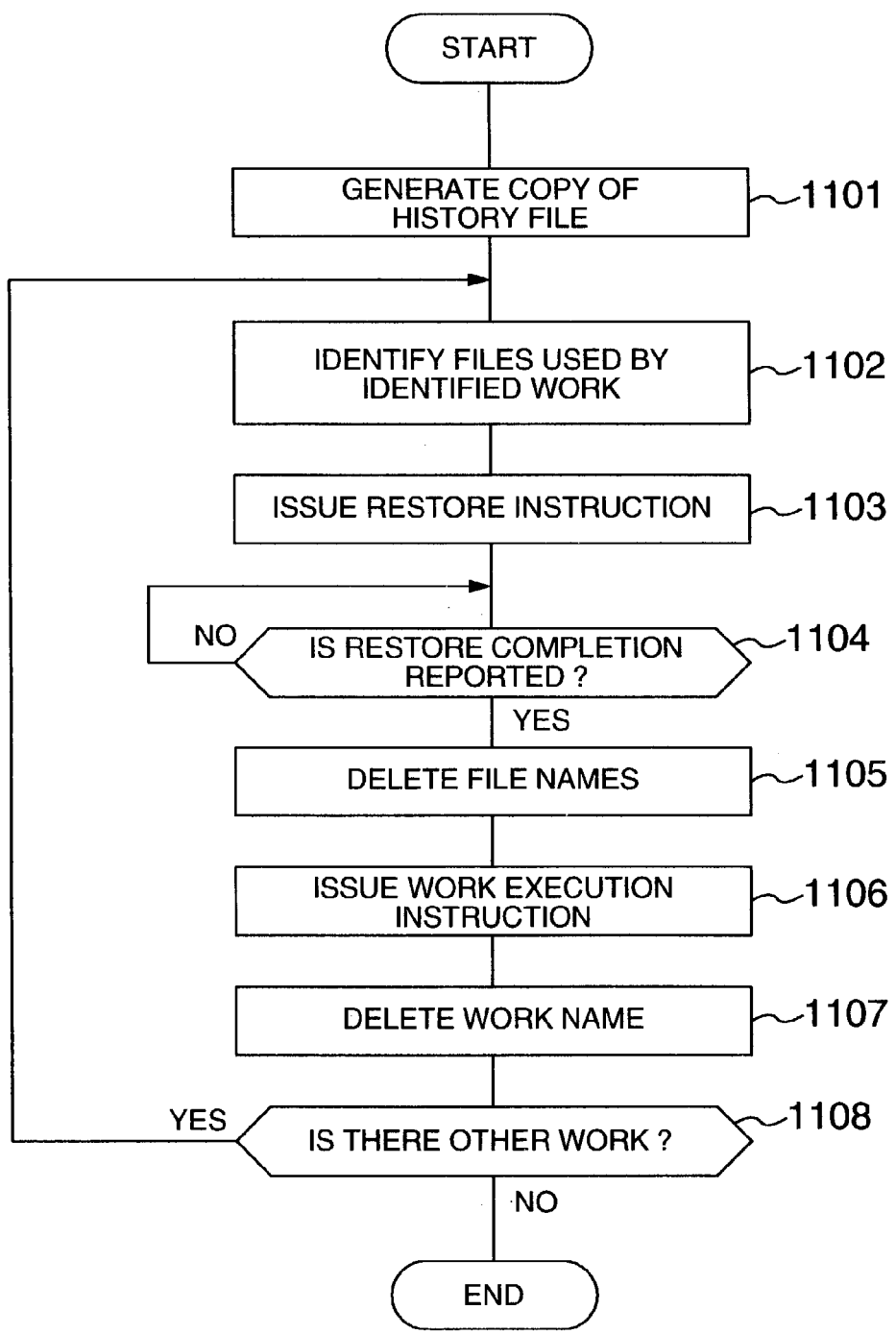
FIG. 11 is a flowchart showing processing performed by the restore management program.

FIG. 11 shows restore processing performed according to the history file. The restore management program 104 first generates a copy of the history file (1101). Here it is assumed that the history file shown in FIG. 4 is copied. Next, the works are executed in a chronological order specified in the copied history file beginning with the work A. The program identifies from the fault remedy file those files used by the work to be executed first (here, work A) (1102) and issues a restore instruction for the identified files (1003). When it is informed of the completion of the restore operation ("YES" in step 1104), the program deletes the restored files from the fault remedy file and issues a work execution instruction to the job schedule program 103 (1106). Upon receiving a work completion report, the program deletes the executed works from the copied history file (1107) and checks if there is any work to be executed. If there still is a work to be executed, the program returns to step 1102.

Figure 12:
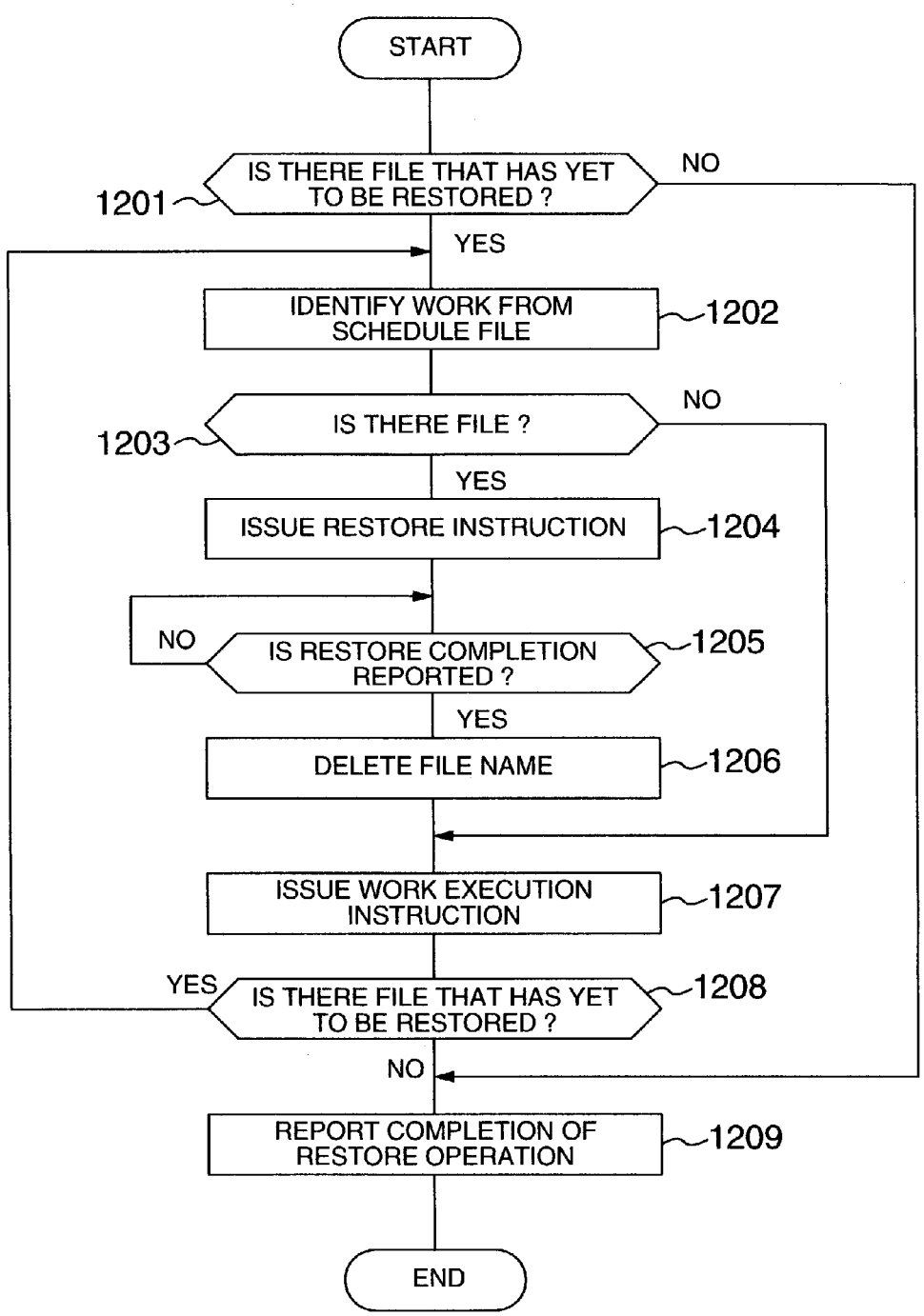
FIG. 12 is a flowchart showing processing performed by the restore management program.

FIG. 12 shows restore processing performed according the fault remedy file.

The restore management program 104 looks up the fault remedy file to see if there is a file that has yet to be restored. If there a file that is not yet restored ("YES" in step 1201), the program 104 determines from the schedule file a work to be executed next (1202) and checks if the fault remedy file has any file associated with the determined work. If the file of interest exists in the fault remedy file ("YES" in step 1203), the program executes the restoring of the file (1204). Upon receipt of a restore operation completion report, the program deletes the restored file from the fault remedy file (1206) and issues a work execution instruction to the job schedule program 103 (1207). The program checks whether there still is a file name registered in the fault remedy file and, if so, returns to step 1202. The work execution continues under the control of the restore management program 104 until all the files registered in the fault remedy file are deregistered. When all the files in the fault remedy file are deregistered, the restore management program 104 reports the completion of the restore operation to the job schedule program 103 (1209). Upon receiving this report, the job schedule program 103 issues an instruction for executing works according to the schedule file.

As described above, by performing the restore operation on only those files required by each work under the control of the restore management program 104, can the work execution be resumed earlier than when it is allowed to be resumed only after all the files registered in the storage device have been restored.

Further, when the storage device that experienced a fault is unstable, a fault may occur again. If another fault occurs after all the files have been restored, a significant amount of time is wasted. On the contrary, since the restore management program 104 restores only the files required by the work, if another fault occurs, the time wasted is reduced. Therefore, this method can also be utilized in investigating a cause of fault by executing the same work.

Further, the restore management program 104 performs the restore operation also on other than the failed storage device on a file basis. This arrangement allows the resumption of work execution to begin earlier than when the works are only allowed to be executed after all the files have been restored. If there is no need to perform the restore operation on the storage device that is not failed, processing from step 1004 to step 1008 can be omitted.

Although the restore management program 104 requests the work server, which manages target files, to restore them, if the work server has a backup program capable of accessing all storage devices for backup, it is possible to distributively execute the works and backup. That is, the restore management program 104 can identify from the schedule file the work server that is not executing works, and send information on restore destinations and files to be restored to the identified work server to have it perform the requested restore operation. This can be done for the following reason. Because the restore management program 104 requests the server to perform the restore operation on a file basis, if the restore operation is not completed during the work execution, the restore operation is considered to be completed in a relatively short time before the next work starts to be executed.

While the system shown in FIG. 1 has been described in a case where a plurality of work servers can use one and the same storage device, the above-described processing can also be executed in a system where one work server is allowed to use only one storage device.

Further, since the restore operation is performed one file at a time, this embodiment registers a relationship between works and work servers as shown in FIG. 3, registers a relation between jobs and files as shown in FIG. 5 and FIG. 6, and determines the files to be restored from the work to be executed. If, however, the files to be used by individual jobs and the associated storage devices are determined in advance, it is possible to register with the schedule file of FIG. 3 the correspondence between works, jobs, files and storage devices. In this case, there is no need to refer to the work server for file configuration.

With this invention, in an environment in which works are executed by a plurality of computers according to a schedule, the resumption of work execution can be quickened.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An information processing system for executing a plurality of works each thereof consisting of at least one job, comprising:
   a plurality of work servers each thereof executing at least one work on a job basis;
   a management server coupled with the plurality of work servers via a first network, for managing execution of the plurality of works, full backup operation and restore operation of works according to an order of a predetermined time schedule of works listed in a schedule file, the management server having a management storage device storing, in addition to the schedule file, a history file listing names of works being executed with execution start times thereof, or having been executed with execution start times and end times thereof;
   a plurality of file storage devices coupled with the plurality of work servers via a second network, for storing job files for the jobs constituting the works; and
   a backup storage device coupled with the work servers and the file storage devices via the second network, for executing full backup operation of works on a job file basis, with each of the job files storing data of a corresponding job,
   wherein, when a failure occurs in a file storage device after completion of full backup operation of works, the management server searches the schedule file and the history file to identify names of works being executed or having been executed after the full backup operation, as well as names of associated work servers and names of jobs of the identified works,
   the management server collects, from the work severs, information concerning names of job files of the identified works and names of file storage devices storing the job files of the identified works to create a fault remedy file indicating names of job files to be restored, based on the collected information, with the job files to be restored being job files of works existing between a work during execution of which the failure occurred and a work to be executed first after the failure occurred, and the fault remedy file excluding a work whose job files are all stored in file storage devices other than the failed file storage device,
   the management server enables a work server to execute restore operation of data from the backup storage on a job file basis, according to the fault remedy file, and
   after the restore operation is completed, the management server enables work servers to restart the works listed in the remedy file.

2. The data transfer apparatus according to claim 1, wherein the first network is a LAN (Local Area Network) and the second network is a SAN (Storage Area Network).

3. A data transfer method for an information processing system for executing a plurality of works each thereof consisting of at least one job, the system comprising:
   a plurality of work servers each thereof executing at least one work on a job basis;
   a management sever coupled with the plurality of work servers via a first network, for managing execution of the plurality of works, full backup operation and restore operation of works according to an order of a predetermined time schedule of works listed in a schedule file, the management server having a management storage device storing, in addition to the schedule file, a history file listing names of works being executed with execution start times thereof, or having been executed with execution start times and end times thereof;
   a plurality of file storage devices coupled with the plurality of work servers via a second network, for storing job files for the jobs constituting the works;
   a backup storage device coupled with the work servers and the file storage devices via the second network, for executing full backup operation of works on a job file basis, with each of the job files storing data of a corresponding job,
   the method comprising the steps of:
   detecting, by the management server, an occurrence of a failure in a file storage device after completion of full backup operation of works;
   searching, by the management sever, the schedule file and the history file to identify names of works being executed or having been executed after the full backup operation, as well as names of associated work servers and names of jobs of the identified works;
   collecting, by the management server from the work servers, information concerning names of job files of jobs of the identified works and names of file storage devices storing the job files of the identified works to create a fault remedy file indicating names of job files to be restored, based on the collected information, with the job files to be restored being job files of works existing between a work during execution of which the failure occurred and a work to be executed first after the failure occurred, and the fault remedy file excluding a work whose job files are all stored in file storage devices other than the failed file storage device;
   enabling, by the management server, a work server to execute restore operation of data from the backup storage on a job file basis, according to the fault remedy file; and
   enabling, by the management sever, work servers to restart the works listed in the remedy file, after the restore operation is completed.

4. The data transfer method according to claim 3, wherein the first network is a LAN and the second network is a SAN.

* * * * *